(12) United States Patent
Köth et al.

(10) Patent No.: US 6,349,801 B1
(45) Date of Patent: Feb. 26, 2002

(54) ELECTROMECHANICALLY ACTUATABLE DISK BRAKE

(75) Inventors: Boris Köth, Eppstein; Kurt Mohr, Halsenbach; Salvatore Oliveri, Filsen, all of (DE)

(73) Assignee: Lucas Industries public limited company (GB)

( * ) Notice: Subject to any disclaimer, the term of this patent is extended or adjusted under 35 U.S.C. 154(b) by 0 days.

(21) Appl. No.: 09/641,046

(22) Filed: Aug. 17, 2000

Related U.S. Application Data

(63) Continuation of application No. PCT/EP99/01081, filed on Feb. 19, 1999.

(30) Foreign Application Priority Data

Feb. 20, 1998 (DE) .......................... 198 07 328

(51) Int. Cl.[7] .............................................. F16D 55/08
(52) U.S. Cl. ..................................................... 188/72.8
(58) Field of Search ............................. 18/71.8, 71.9, 18/72.7, 72.8, 72.1

(56) References Cited

U.S. PATENT DOCUMENTS

| 3,924,479 | A | * | 12/1975 | Lanzenberger | 188/72.7 |
| 4,850,457 | A | * | 7/1989 | Taig | 188/72.7 |
| 5,107,967 | A | | 4/1992 | Fujita et al. | |
| 5,219,047 | A | * | 6/1993 | Fouilleux et al. | 188/71.9 |
| 5,348,123 | A | * | 9/1994 | Takahashi | 188/72.1 |
| 5,788,023 | A | * | 8/1998 | Schoner et al. | 188/72.7 |
| 5,829,557 | A | | 11/1998 | Halasy-Wimmer et al. | |
| 5,915,504 | A | * | 9/1999 | Doricht | 188/72.1 |
| 5,971,110 | A | * | 10/1999 | Martin | 188/72.8 |

FOREIGN PATENT DOCUMENTS

| DE | 195 11 287 A1 | 1/1996 |
| DE | 195 43 098 A1 | 12/1996 |
| DE | 19543098 A1 | * 12/1996 |
| DE | 196 05 988 A1 | 8/1997 |
| WO | WO 98/34042 | 8/1998 |

OTHER PUBLICATIONS

Dubbel, vol. 14, 1981, p. 424.

* cited by examiner

Primary Examiner—Robert A. Siconolfi
(74) Attorney, Agent, or Firm—MacMillan, Sobanski & Todd, LLC

(57) ABSTRACT

The invention relates to an electromechanically actuatable disk brake with a housing, a friction pad against which an electrically actuatable actuator acts, with the actuator comprising an electric motor and a spindle/nut transmission arrangement, characterised in that the electric motor is configured as an internal rotor motor with a stator and a rotor, the rotor of which is coupled non-rotably with the spindle, the spindle is operatively coupled with the nut in order to transform a rotational movement of the spindle into a translatory movement of the nut, the spindle is supported along its longitudinal extent in at least two places so as to be rotatable relative to the housing, and the nut is guided axially slidable relative to the housing.

29 Claims, 3 Drawing Sheets

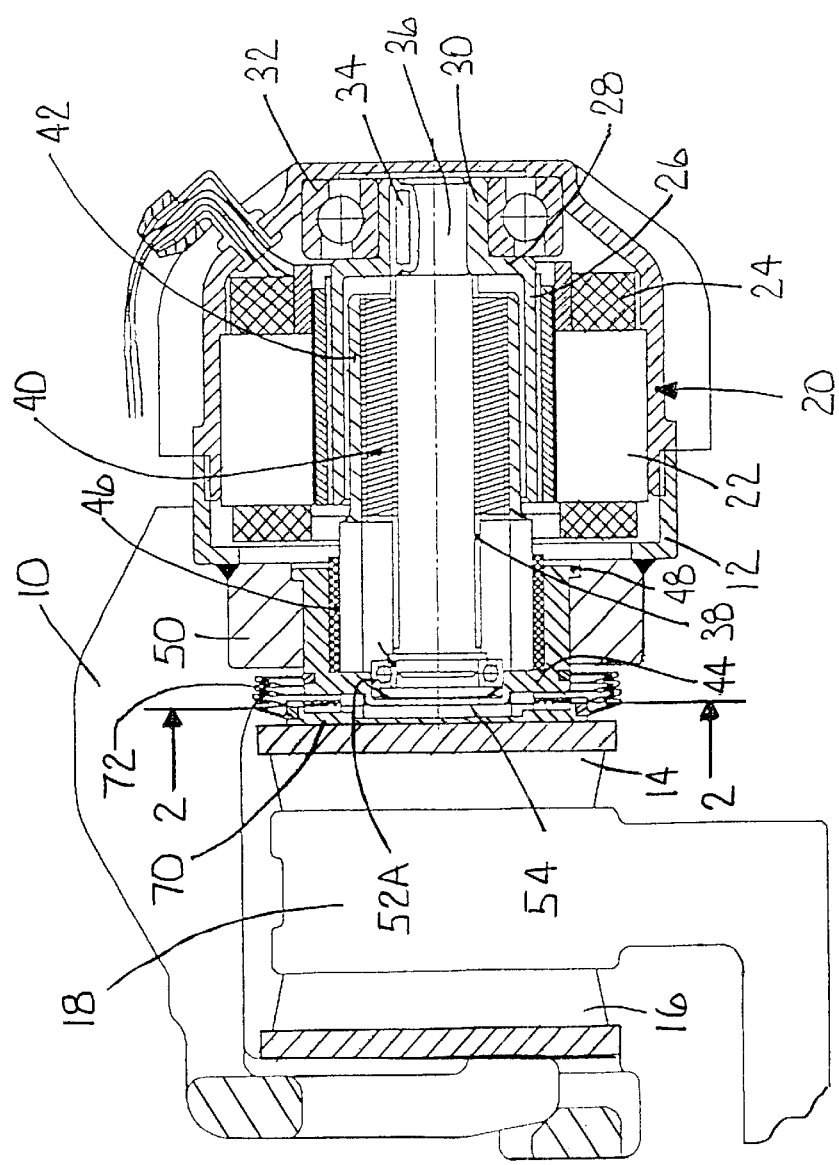

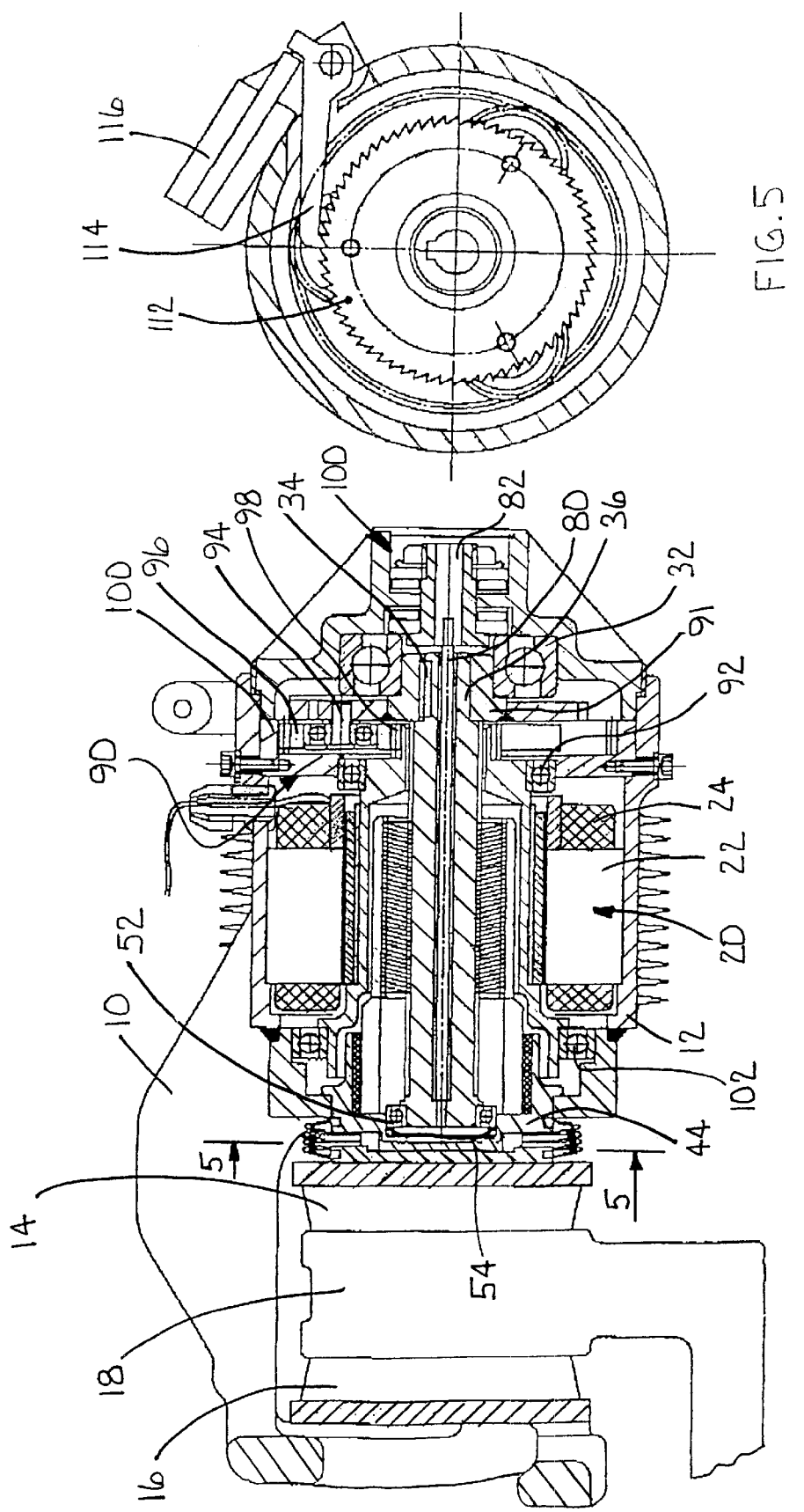

ELECTROMECHANICALLY ACTUATABLE DISK BRAKE

This application is a continuation of PCT/EP99/01081 filed Feb. 19, 1999.

BACKGROUND OF THE INVENTION

The invention relates to an electromechanically actuatable disk brake with a housing and a friction pad which is slidably supported at the housing, against which an electrically actuatable actuator acts, with the actuator comprising an electric motor and a spindle/nut (transmission) arrangement.

Such vehicle brake arrangements, in particular in the form of disk brakes, are known from so-called brake-by-wire systems.

These arrangements are based on the problem of transforming the rotational movement of the electric motor into a translatory movement of the friction pads relative to the brake disk, with high feed forces being required on the one hand and high dynamics of the feed motion being required, on the other hand. In addition, there is the requirement for a high reliability with a high mechanical efficiency within a wide temperature range as occurs in vehicle brakes. Moreover, the requirement for a self-releasing capability of the friction pads from the brake disk upon a current failure of the electric motor must be met. In addition, the limited installation space at the vehicle wheel is to be utilised efficiently, and the unsprung masses are to be kept small. Another aspect with the employment of spindle/nut arrangements for the transmission of the rotational movement into a translation movement is that, if possible, no transverse forces or bending moments are introduced into the spindle transmission, because the spindles are generally not designed for this and the spindle efficiency will then considerably deteriorate.

The selection of the spindle pitch and the spindle diameter is decisively dependent on the required spindle axial force and the available drive moment at the spindle nut. In addition, the axial force provided by the spindle must be supported by an adequately dimensioned axial bearing.

DE 195 11 287 A1 shows a floating caliper brake wherein an electric motor which is formed as an outside rotor drives a nut which is rigidly coupled with the rotor of the electric motor. A screw spindle is displaced in the axial direction via threaded rollers which are in engagement with the nut, when the electric motor sets the nut and thus the threaded rollers in rotation. The screw spindle acts on a friction pad. The screw spindle is supported in the rotor of the electric motor by the threaded rollers. The rotor of the electric motor with its end facing the friction pad is guided via a radial bearing which bears against the housing.

From DE 195 43 098 A1 a floating caliper brake is known, wherein an electric motor which is formed as an inside rotor drives a screw spindle. The spindle has a male thread which is in engagement with threaded rollers, which are arranged along the circumference of the spindle in a distributed manner. A female thread of a threaded bushing engages at the periphery of the rollers. The threaded bushing is connected with a friction pad so that the friction pad is displaced in the axial direction upon a rotation of the motor. The rotor of the electric motor is provided with a hollow axle for accommodating the spindle rod. At its rear side, the rotor bears against the housing via a radial bearing and against the spindle rod via an axial bearing.

In the two above mentioned arrangements, either transverse forces of the electric motor are acting on the point of contact between the spindle and the rollers, or the friction pads generate reactive forces onto the points of contact between the spindle and the rollers under operating conditions. In both cases the consequence is increased wear and higher friction forces between the points of contact at the spindle or the rollers, respectively. The result of this is that the self-releasing capability and the precision of the actuating movement is affected.

From DE 196 05 988 A1 a floating caliper brake is known, wherein an electric motor with an inside rotor drives a screw spindle. In order to be able to manage with a small drive motor, the rotor is designed as a cup inside of which the screw spindle is arranged. The screw spindle bears with only one end against the bottom of the cup which is supported at the housing by an axial and two radial bearings. Along its longitudinal extension the screw spindle is not supported further so that the other end of the screw spindle is free. Planetary rollers are abutting the screw spindle, by means of which a rotational movement of the screw spindle is transferred into an axial displacement of a nut. The nut bears radially against the inside of the cup-shaped rotor or its radial bearings, respectively. Due to the fact that the second axial end of the screw spindle is not radially supported, this arrangement is disadvantageous in that a shift of the free end of the screw spindle, which is caused by mechanical stress and wear, results in an eccentric rotational movement so that the planetary rollers are stressed unevenly and the actuation movement becomes unprecise.

SUMMARY OF THE INVENTION

The invention is based on the object to improve a vehicle brake of the initially mentioned type in such a manner that these drawbacks are eliminated.

The inventive solution provides for the electric motor to be configured as an internal rotor motor with a stator and a rotor, the rotor of which is coupled secured against rotation with the spindle, the spindle is operatively coupled with the nut in order to transform a rotational movement of the spindle into a translatory movement of the nut, the spindle is radially supported along its longitudinal extent in at least two places so as to be rotatable relative to the housing, and the nut is guided axially slidable relative to the housing.

The bearing arrangements provided in the state of the art do not represent a solution of this problem. By means of the axial sliding guidance of the nut, the inventive configuration compensates transverse forces acting on same from the brake shoes, so that no transverse forces are transferred to the rollers. The double bearing of the spindle has the effect that transverse forces from the electric motor can be taken up by the housing, without being able to cause deformations of the spindle.

In a preferred embodiment of the invention, the spindle is in a driving connection with the nut via planetary rollers.

The spindle is rotatably supported in the area of its two ends. A first bearing is preferably designed as a locating bearing and a second bearing as a floating bearing relative to the housing in the axial direction. This permits a compensation of forces which cause an axial deflection of the spindle.

The nut is slidably guided in a sliding bushing or directly in the housing. A direct guidance of the nut in the housing (without a separate sliding bushing) reduces the manufacturing expenditure.

In the area of the end of the spindle which faces the friction pad a bearing shield is provided according to the invention, which forms a bearing position for the spindle and/or a bearing position for the nut. The bearing shield can either be formed integrally with the housing, or can be formed as a component which is separately inserted into a corresponding opening in the housing. Thus, the bearing shield can assume a twofold function with a defined correlation of the bearing position for the spindle and the bearing position for the nut being able to be manufactured precisely in a simple manner.

In a particularly preferred embodiment, the nut comprises at least one extension which can protrude through a correspondingly formed opening in the bearing shield, in order to transfer the axial movement of the nut through the bearing shield to the outside to the friction pad.

The second bearing for the spindle (i.e. the floating bearing) is preferably accommodated in a corresponding recess in the bearing shield and bears against the housing via webs which are arranged between the opening between the extensions of the nut. This particularly preferred embodiment permits a very compact and closed configuration of the arrangement.

The extension or each extension of the nut as well as the respective associated opening are preferably designed in such a manner that the nut is secured against rotation relative to the housing. In this manner, the nut is additionally guided both in the axial and in the radial direction towards the area of the openings.

In order to avoid the ingress of dust or humidity into the interior of the housing, an intermediate element is preferably arranged between the friction pad and the extension or the extensions of the nut, which serves as an end piece of the extension(s) of the nut or for accommodating a seal (e.g. in the form of a bellows).

In a particularly preferred manner the end of the spindle, which is accommodated at the floating bearing, is biased by a spring arrangement in the axial direction against the housing.

This can compensate for expansions of the spindle or the housing, but also of other components, which are primarily caused by temperature variations.

In a further configuration the spindle is coupled with a spring-loaded cylinder which upon a feed motion takes up work which is directed opposite said feed motion and which causes a resetting movement of the spindle or the nut, respectively, with a currentless electric motor. In this manner, it is ensured that the friction pad clears the brake disk.

In order to achieve a particularly space-saving arrangement of the spring-loaded cylinder this can be designed as a torsion rod formed in a longitudinal hole of the spindle. This arrangement is advantageous in that the spindle/nut arrangement can be designed self-locking so that a parking brake function can be realised. By a controlled charging or discharging, respectively, of the spring-loaded cylinder, the spindle can be brought into rotation by the spring-loaded cylinder against the feed force, even with a non-functional electric motor, so that the brake disk and the friction pad clear each other.

The spring-loaded cylinder is preferably arranged relative to the spindle, the motor, and the housing in such a manner that the charging/discharging process of the spring-loaded cylinder can be controlled by means of a coupling which is coupled with the spring-loaded cylinder.

It is particularly preferred that the disk brake comprises a floating caliper which carries two friction pads between which the brake disk is arranged. The floating caliper is designed in such a manner that, upon a feed motion, it takes up work which is directed against said feed motion and which causes a resetting movement of the spindle or the nut, respectively, with a currentless electric motor so that the friction pad clears the brake disk. This configuration permits the omission of a special spring-loaded cylinder and forms a particularly simple construction of the disk brake.

In a further embodiment, a further transmission stage, preferably in the form of a planetary transmission, is provided in addition to the roller/spindle or nut/spindle (transmission) arrangement.

Further characteristics, properties, and modification possibilities will be explained by means of the description of three embodiments with reference to the accompanying drawings.

BRIEF DESCRIPTION OF THE DRAWINGS

FIG. 1 shows a first embodiment of an inventive electromechanicanically actuatable disk brake as a schematic illustration of a longitudinal section.

FIG. 2 shows a sectional view through the electromechanicanically actuatable disk brake according to FIG. 1 along the section lines 2—2.

FIG. 4 shows a third embodiment of an inventive electromechanicanically actuatable disk brake as a illustration of a longitudinal section.

FIG. 5 shows a sectional view through the electromechanicanically actuatable disk brake according to FIG. 4 along the section lines 5—5.

DETAILED DESCRIPTION OF THE PREFERRED EMBODIMENTS

Figure 3:
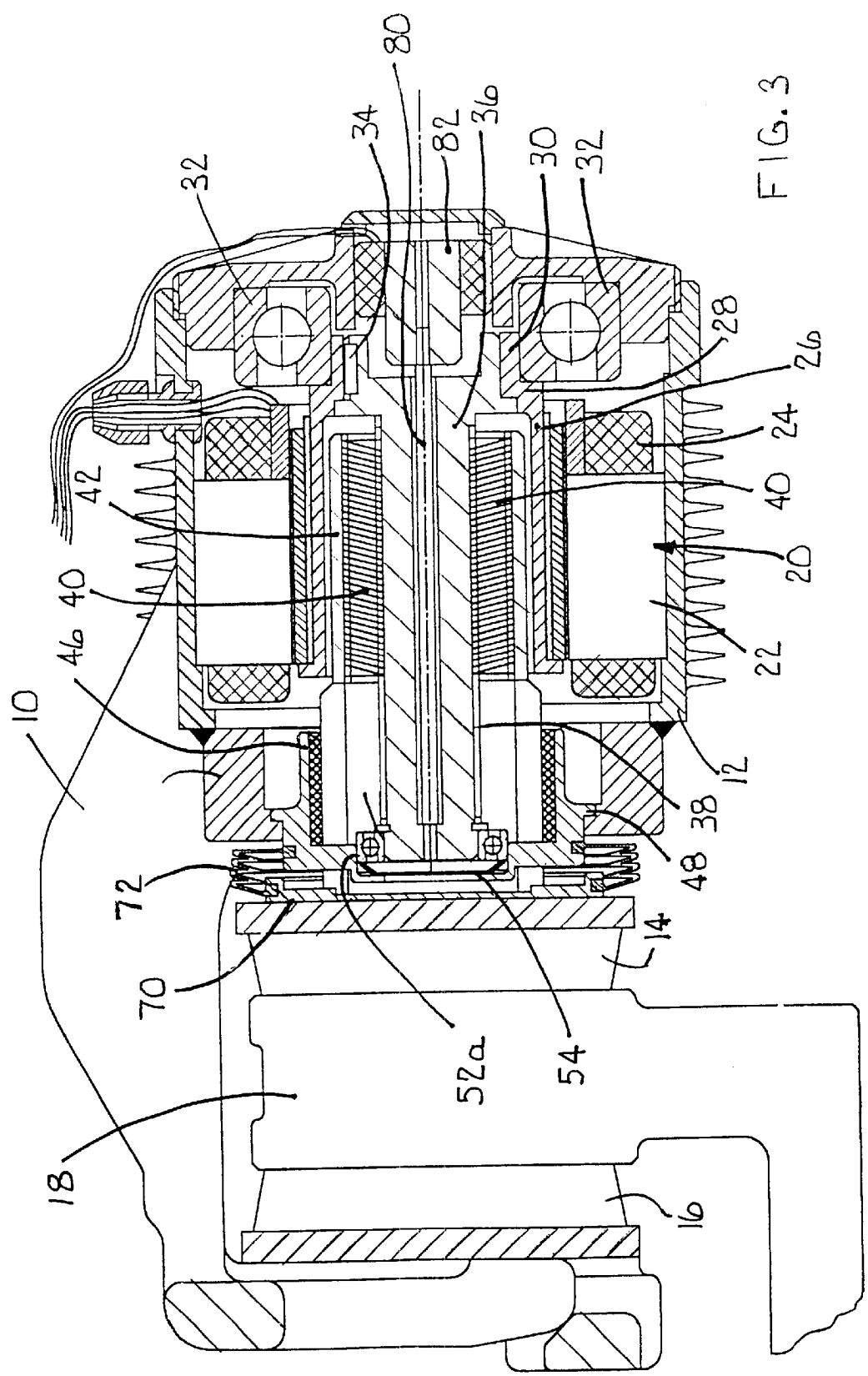
FIG. 3 shows a second embodiment of an inventive electromechanicanically actuatable disk brake as a illustration of a longitudinal section.

The electromechanically actuatable disk brake which is schematically shown in FIG. 1 is designed as a floating caliper disk brake with a floating caliper 10 which is securely connected with a housing 12. In the floating caliper 10 two friction pads 14, 16 are accommodated between which a brake disk 18 is arranged which is indicated only schematically.

In the housing 12 an internal rotor motor 20 is accommodated. A stator 22 which is built from iron laminations with a corresponding stator winding 24 is pressed into the housing. A rotor 26 of the electric motor 20 comprises a step 28 at its end facing away from the friction pad 14, which carries a collar 30. The collar 30 is fitted into a ball bearing 32 which is accommodated in a corresponding recess in the housing 12. A first end of a screw spindle 36 is accommodated in the collar 30 of the rotor 28 secured against rotation by means of a feather key 34 acting as a n anti-rotation means. Thus, this first end of the screw spindle 36 also bears against the housing through the ball bearing 32. Due to the fact that this first end of the screw spindle 36 is firmly pressed into the step 30 of the rotor 26, a locating bearing for the screw spindle 36 is formed thereby. The screw spindle 36 comprises a male thread 38 which is in engagement with several (three or more) cylindrical threaded rollers 40.

The threaded rollers 40 meshing with the screw spindle 36 are dimensioned in the radial direction in such a manner that they are also engaging a nut 42 which has the shape of a hollow cylindrical bushing with a female thread. The nut 42 extends coaxially to the screw spindle 36 to a bearing shield 44 which closes the housing. The bearing shield 44 is designed cup-shaped and carries a sliding bushing 46 as a radial guide for the nut 42 at its cylindrical inner wall. The bearing shield 44 has an outwardly directed collar 48 at its open end, which is accommodated in a corresponding indentation in a cover 50 of the housing 12. The collar 48 thus prevents a deflection of the bearing shield 44 in the axial direction.

The bearing shield 44 comprises an indentation in alignment with the screw spindle 36, in which a second ball bearing 52 is accommodated. The ball bearing 52 bears against the bottom of the indentation via a plate spring 54 in such a manner that the plate spring 54 acts on an ring 52a of the ball bearing 52. The ball bearing 52 is accommodated play-free in an axially slidable manner in the opening of the bearing shield 44 so that the ball bearing 52 or the bearing shield 44, respectively, forms a floating bearing for the screw spindle 36.

The bearing shield 44 comprises semi-circular annular openings 60 (see FIG. 2) further to the outside than the outer circumference of the ball bearing 52, through which the matingly shaped extensions 62 of the nut 42 extend. Upon an actuation of the electric motor 20, the nut 42 is brought into a longitudinal movement by the rotational movement of the screw spindle 36 or the threaded rollers 40, through which the extensions 62 in the openings 60 either protrude or retract depending on the sense of rotation of the electric motor 20. Between the openings 60 webs 64 are arranged by means of which a rotation of the nut 42 or its extensions 62, respectively, is prevented. With their free ends the extensions 62 engage in correspondingly formed recesses in a plate-shaped formed intermediate element 70 which serves as an end plate of the extensions 62 of the nut 40. In addition, the intermediate element 70 serves to accommodate a tubular bellows 72 whose one end is accommodated at the intermediate element 70, and whose other end is accommodated at the outside of the bearing 44. By means of the intermediate element 70 which accommodates the extensions 62 in correspondingly designed recesses, it is prevented that the extensions buckle 62 laterally upon an axial stress on the nut 42.

The intermediate element 70 acts flatly on the friction pad 14 so that upon an actuation of the electric motor in the sense of a feed of the disk brake, the friction pad 14 is urged against the brake disk 18. With the feed motion of the nut 40 that brake disk is thereby also urged against the second friction pad 16. The floating caliper 10 takes up this work and closes the power train to the housing 12. The floating caliper 10 can be designed in such a manner that is comprises a certain elasticity and stores work directed against this feed motion in an elastic deformation until the electric motor 20 becomes currentless. Then this work becomes free and urges the spindle or the nut, respectively, into a resetting movement via the brake disk 18 and the friction pad 14. Thereby, the holding force of a self-locking spindle/nut arrangement can be overcome so that the friction pad 14 clears the brake disk 18.

The bearing 52 and thus the screw spindle 36 as well are resiliently clamped in the housing by the plate spring 54 so that no play worth mentioning can occur between the screw spindle 36 and the threaded rollers 40, or between the threaded rollers 40 and the nut 42, respectively.

In FIG. 3, identical parts or parts which have the same effect as compared to FIG. 1 or FIG. 2 are given identical reference numerals and are not explained again in detail in the following. The same applies to FIG. 4 and FIG. 5 which will be explained further below.

The main difference between the embodiment from FIG. 1 and the embodiment in FIG. 3 is that the screw spindle 36 is coupled with a spring-loaded cylinder in the form of a torsion spring 80, which upon a feed motion takes up a force directed against said feed motion. With a currentless electric motor (20), a charged spring-loaded cylinder 80 causes a resetting movement of the spindle or the nut, respectively, directed against the feed motion. Thereby, the friction pad can clear the brake disk, in particular, if a self-locking spindle/nut arrangement is employed. For reasons of space, the torsion spring 80 is arranged in the interior of the screw spindle 36. For this purpose, the torsion spring 80 is accommodated at its one end (in the area of the floating bearing 52) secured against rotation in a hole. The other end of the torsion spring 80 (in the area of the ball bearing 32) protrudes from the face end of the screw spindle 36. The end of the torsion spring 80 which protrudes from the screw spindle 36 is accommodated in a coupling 82 which can be actuated electrically in order to load or release the torsion spring 80 relative to the housing 12 in a controlled manner, with the torque applied by the torsion spring 80 being limited.

When using a self-locking spindle/nut arrangement together with a non-elastic floating caliper, a parking brake function can be realised as well. For this purpose, the torsion spring 80 is released relative to the housing 12 by the electrically actuatable coupling 82, so that no resetting movement of the screw spindle 36 or the nut 42, respectively, directed against the feed motion can take place, so that after actuation for parking, the friction pad (14, 16) remains in frictional engagement with the brake disk 18. Contrary thereto, for the realisation of the service brake function, the torsion spring 80 is loaded against the housing 12 by the electrically actuatable coupling 82, so that upon a rotation of the screw spindle 36 the torsion spring is rotated and thus work is applied which is directed against the feed motion. This work will subject the spindle or nut, respectively, to a resetting movement, with the electric motor being currentless, so that the friction pad can clear the brake disk.

The embodiment according to FIG. 4 differs from the embodiment according to FIG. 1 insofar, as a second transmission stage in the form of a planetary transmission 90 is provided. For this purpose, a planet carrier 91 which is supported in the housing 12 by means of a ball bearing 32 is provided with several openings which accommodate bearing journals 94 for planetary gears 96. The planetary gears 96 mesh with a ring gear 100 with internal toothing. In the area of the end of the screw spindle 36 remote of the friction pad 14, the planet carrier 91 is connected secured against rotation by means of an anti-rotation means 34. In the area of the end remote from the friction pad 14, the rotor 26 forms a sun gear 98. An additional ball bearing 102 forms a floating bearing for the rotor 26, while the ball bearing 92 forms a locating bearing for the rotor 26. Through the two-stage design of the transmission, higher feed forces can be achieved. Moreover, the spindle/nut arrangement can be designed self-releasing by a correspondingly selected thread pitch.

FIG. 4 is a third embodiment which has the screw spindle 36 coupled with a spring-loaded cylinder in the form of a torsion spring 80 like the embodiment shown in FIG. 3. However, the face end of the torsion spring 80, which protrudes from the screw spindle 36, is accommodated in a torque limiter 110, which functions purely mechanically. As soon as the torsion spring 80 has reached the torque required for the resetting movement against the feed motion after a certain number of revolutions or a certain proportion of a revolution in the feed direction, this moment is kept almost constant by the torque limiter 110.

The further embodiment is additionally adapted for the parking brake function. As can be seen from the sectional view along the section line 5—5 in FIG. 4, a (saw tooth) ring gear 112 is provided for this purpose, which is connected with the screw spindle 36 secured against rotation, which is driven by the electric motor via the axles of the planetary gears 96 of the second transmission stage. The (saw tooth) ring gear 112 which is connected with the screw spindle 36 secured against rotation can be arrested by means of a ratchet 114, with the ratchet 114 being electrically operable. For parking, the brake is actuated which, among other methods, can be done as it is usual with the service brake via the brake pedal until the necessary clamping force is achieved. Subsequently, the ratchet 114 is operated, which in turn arrests the (saw tooth) ring gear 112 so that a resetting movement is excluded, and consequently the friction pad 14 remains in frictional engagement with the brake disk 18. Contrary to the embodiment shown in FIG. 3, the spindle/nut arrangement need not necessarily be designed self-locking in this case in order to enable the parking brake function.

It is of particular advantage if for the operation of the ratchet 114 a "bistable" (electrotechnical, electromagnetical) changeover switch 116 is employed which requires the supply of current for changing over only, for example, by means of a pulse-shaped current, and which, after changing over, remains currentless in its last assumed position. The same applies for the electrically actuatable coupling according to FIG. 3.

Although the three embodiments have been separately described above, it is understood by those with skill in the art that individual aspects of one embodiment can also be transferred into the respective other two embodiments without departing from the inventive idea.

What is claimed is:

1. An electromechanically actuatable disk brake comprising:
   a housing;
   a friction pad against which an electrically actuatable actuator acts, said actuator comprising an electric motor and a spindle/nut transmission arrangement, wherein said electric motor is configured as an internal rotor motor having a stator and a rotor, said rotor of which is non-rotatably coupled with a spindle, said spindle operatively coupled with a nut in order to transform a rotational movement of said spindle into a translatory movement of said nut, said nut guided axially slidable relative to said housing, wherein said spindle is radially supported by a first bearing in the region of its first longitudinal end and by a second bearing in the region of its opposite longitudinal end so as to be rotatable relative to said housing.

2. The electromechanically actuatable disk brake according to claim 1, characterized in that said spindle is operatively connected with said nut via planetary rollers.

3. The electromechanically actuatable disk brake according to claim 1, characterized in that said first bearing is designed as a locating bearing and said second bearing is designed as a floating bearing relative to said housing in the axial direction.

4. The electromechanically actuatable disk brake according to claim 1, characterized in that said nut is slidably guided in a sliding bushing or directly in said housing.

5. The electromechanically actuatable disk brake according to claim 1, characterized in that a bearing shield is provided in the area of an end of said spindle which faces towards a friction pad of the disk brake in order to provide a bearing position for said spindle and/or a bearing position for said nut.

6. The electromechanically actuatable disk brake according to claim 5, characterized in that said nut includes at least one extension which extends through a correspondingly formed opening in said bearing shield and acts upon the friction pad.

7. The electromechanically actuatable disk brake according to claim 6, characterized in that said at least one extension and said correspondingly formed opening are designed in such a manner that said nut is secured against rotation relative to said housing.

8. The electromechanically actuatable disk brake according to claim 6, characterized in that an intermediate element is arranged between the friction pad and said at least one extension of said nut which serves as an end piece of said extension of said nut and/or for accommodating a seal.

9. The electromechanically actuatable disk brake according to claim 5, characterized in that a second bearing for said spindle is provided at said bearing shield and is adapted to bear against said housing via webs arranged between openings for said extensions.

10. The electromechanically actuatable disk brake according to claim 3, characterized in that an end of said spindle which is accommodated at said floating bearing is biased by a spring arrangement in an axial direction against said housing.

11. The electromechanically actuatable disk brake according to claim 1, characterized in that said spindle is coupled with a spring loaded cylinder which upon a feed motion takes up work directed against said feed motion, which with said electric motor being currentless causes a resetting movement of said spindle or said nut, respectively, so that a friction pad of the disk brake clears a brake disk.

12. The electromechanically actuatable disk brake according to claim 11, characterized in that said spring loaded cylinder is arranged relative to said spindle, said motor, and said housing in such a manner that a charging/discharging process of said spring loaded cylinder can be controlled by means of a coupling which is coupled with said spring loaded cylinder.

13. The electromechanically actuatable disk brake according to claim 11, characterized in that said spring loaded cylinder is formed by a torsion spring which is arranged in a hollow space in an interior of said spindle.

14. The electromechanically actuatable disk brake according to claim 1, characterized in that the disk brake includes a floating caliper which carries two friction pads between which a brake disk is arranged, said floating caliper being designed in such a manner that, upon a feed motion, it stores work as potential energy which is directed against said feed motion which, with the electric motor being currentless, causes a resetting movement of said spindle or said nut, respectively, as a kinetic energy to be released, so that the friction pad clears the brake disk.

15. The electromechanically actuatable disk brake according to claim 2, characterized in that in addition to said roller/spindle transmission arrangement, a further transmission stage in the form of a planetary transmission is provided.

16. The electromechanically actuatable disk brake according to claim 13, characterized in that said torsion spring protruding from said spindle is operatively connected with a torque limiter so that after a predetermined torsional motion of said torsion spring in said feed direction of the vehicle brake, the torque required for a resetting movement against said feed motion can be reached and kept constant.

17. The electromechanically actuatable disk brake according to one of the previous claims, characterized in that said spindle is connected with a ring gear secured against rotation which can be brought into a rotational movement by means of bearing journals of planetary gears and be arrested by means of a ratchet.

18. The electromechanically actuatable disk brake according to claim 17, characterized in that said ratchet can be operated by means of a bistable current impulse magnet which is to be supplied with current for changing over only.

19. An electromechanically actuatable disk brake comprising:
  a housing;
  a friction pad against which an electrically actuatable actuator acts, said actuator comprising an electric motor and a spindle/nut transmission arrangement, wherein said electric motor is configured as an internal rotor motor having a stator and a rotor, said rotor of which is non-rotatably coupled with a spindle, said spindle operatively coupled with a nut in order to transform a rotational movement of said spindle into a translatory movement of said nut, said spindle radially supported along its longitudinal extent in at least two places so as to be rotatable relative to said housing, and said nut guided axially slidable relative to said housing, characterized in that said spindle is rotatably supported in the area of its two ends and that a first bearing is designed as a locating bearing and a second bearing is designed as a floating bearing relative to said housing in the axial direction.

20. The electromechanically actuatable disk brake according to claim 19, characterized in that an end of said spindle which is accommodated at said floating bearing is biased by a spring arrangement in an axial direction against said housing.

21. An electromechanically actuatable disk brake comprising:
  a housing;
  a friction pad against which an electrically actuatable actuator acts, said actuator comprising an electric motor and a spindle/nut transmission arrangement, wherein said electric motor is configured as an internal rotor motor having a stator and a rotor, said rotor of which is non-rotatably coupled with a spindle, said spindle operatively coupled with a nut in order to transform a rotational movement of said spindle into a translatory movement of said nut, said spindle radially supported along its longitudinal extent in at least two places so as to be rotatable relative to said housing, and said nut guided axially slidable relative to said housing, characterized in that said spindle is rotatably supported in the area of its two ends and that a bearing shield is provided in the area of an end of said spindle which faces towards a friction pad of the disk brake in order to provide a bearing position for said spindle and/or a bearing position for said nut.

22. The electromechanically actuatable disk brake according to claim 21, characterized in that a bearing shield is provided in the area of an end of said spindle which faces towards a friction pad of the disk brake in order to provide a bearing position for said spindle and/or a bearing position for said nut.

23. The electromechanically actuatable disk brake according to claim 22, characterized in that said nut includes at least one extension which extends through a correspondingly formed opening in said bearing shield and acts upon the friction pad.

24. The electromechanically actuatable disk brake according to claim 23, characterized in that a second bearing for said spindle is provided at said bearing shield and is adapted to bear against said housing via webs arranged between openings for said extensions.

25. The electromechanically actuatable disk brake according to claim 23, characterized in that said at least one extension and said correspondingly formed opening are designed in such a manner that said nut is secured against rotation relative to said housing.

26. The electromechanically actuatable disk brake according to claim 23, characterized in that an intermediate element is arranged between the friction pad and said at least one extension of said nut which serves as an end piece of said extension of said nut and/or for accommodating a seal.

27. An electromechanically actuatable disk brake comprising:
  a housing;
  a friction pad against which an electrically actuatable actuator acts, said actuator comprising an electric motor and a spindle/nut transmission arrangement, wherein said electric motor is configured as an internal rotor motor having a stator and a rotor, said rotor of which is non-rotatably coupled with a spindle, said spindle operatively coupled with a nut in order to transform a rotational movement of said spindle into a translatory movement of said nut, said spindle radially supported along its longitudinal extent in at least two places so as to be rotatable relative to said housing, and said nut guided axially slidable relative to said housing, characterized in that said spindle is rotatably supported in the area of its two ends and that said spindle is coupled with a spring loaded cylinder which upon a feed motion takes up work. directed against said feed motion, which with said electric motor being currentless causes a resetting movement of said spindle or said nut, respectively, so that a friction pad of the disk brake clears a brake disk.

28. The electromechanically actuatable disk brake according to claim 27, characterized in that said spring loaded cylinder is arranged relative to said spindle, said motor, and said housing in such a manner that a charging/discharging process of said spring loaded cylinder can be controlled by means of a coupling which is coupled with said spring loaded cylinder.

29. The electromechanically actuatable disk brake according to claim 27, characterized in that said spring loaded cylinder is formed by a torsion spring which is arranged in a hollow space in an interior of said spindle.

* * * * *